Patented Feb. 20, 1923.

1,446,120

UNITED STATES PATENT OFFICE.

WILLIAM HORLICK, JR., OF RACINE, WISCONSIN.

FOOD PRODUCT AND METHOD OF MANUFACTURE THEREOF.

No Drawing. Application filed August 27, 1920. Serial No. 406,404.

*To all whom it may concern:*

Be it known that I, WILLIAM HORLICK, Jr., a citizen of the United States, and a resident of Racine, county of Racine, and State of Wisconsin, have invented certain new and useful Improvements in Food Products and Methods of Manufacture Thereof, of which the following is a specification.

The invention relates to the manufacture of food compounds containing milk as one of its ingredients and seeks to provide an improved product and method of manufacture by which the keeping qualities and digestibility of such compounds are materially increased. The invention consists in the features of improvement hereinafter set forth and more particularly pointed out in the appended claims.

In accordance with the present invention, the milk employed is first thoroughly homogenized to render it of uniform composition and break or split up the contained fat globules so that they cannot return to their original form. Preferably fresh milk is employed though it may be concentrated or condensed either before or after homogenization.

The homogenized milk is mixed with other suitable ingredients, such as an infusion or liquid extract of converted starch products or maltose, cocoa and flavoring material. The mixture is then evaporated and is preferably reduced to powdered form by any of the usual methods now employed, such as the vacuum drum dryer or spray method.

The liquid extract or wort is preferably prepared from barley malt and wheat or other flour. For example, a mash is formed of equal parts by weight of barley malt and wheat flour and four to five times as much water at temperature of 135° to 140° F. The temperature is slowly raised in about thirty minutes to 150 or 165° F. This temperature is retained for twenty to twenty-five minutes and the temperature is again increased to about 175° F. By this treatment, the starch is converted into maltose and dextrine and the insoluble albumenoids are converted into soluble form.

The wort or liquid extract obtained from the mash is drawn off and mixed with about an equal quantity of fresh milk, or its equivalent of concentrated or condensed milk, and which has first been thoroughly homogenized by forcing the same under very high pressure through minute orifices or crevices. Any desired flavoring material, such as coffee, cocoa or chocolate may then be added, or, if desired, such ingredients may be employed without the previous addition of the malt wort. The mixture thus formed is then evaporated and is reduced to powdered form.

By first homogenizing the milk, the fat globules are effectively broken up into minute particles, are more readily acted upon by the enzymes in the milk and the casein is thereby more easily digested. Again in the evaporating or drying process, the minute fat particles are effectively coated or covered with the maltose or other ingredients employed, and in this way, a food compound, which has excellent keeping qualities and can be readily assimilated by a weak stomach, is produced.

Obviously, changes may be made in the details set forth without departure from the essentials of the invention as defined in the claims.

I claim as my invention:

1. The process of manufacturing food compounds which consists in first homogenizing milk to effectively break up the contained fat globules, admixing the same with converted starch products and reducing the mixture to powdered form, substantially as described.

2. The process of manufacturing food compounds which consists in first homogenizing milk to effectively break up the contained fat globules, admixing the homogenized milk with an infusion of converted starch products and evaporating the same to a highly concentrated form, substantially as described.

3. The process of manufacturing food compounds which consists in first homogenizing milk to effectively break up the contained fat globules, admixing the same with an infusion of converted starch products and a suitable flavoring material and reducing the same to powdered form, substantially as described.

4. A compound food product comprising a mixture of homogenized milk, converted starch material and a suitable flavoring material reduced to powdered form, substantially as described.

5. A food composition comprising an intimate mixture of homogenized milk and converted starch material in powdered form.

WM. HORLICK, Jr.